P. K. DEDERICK.
Improvement in Baling-Presses.
No. 5,023. Reissued Aug. 6, 1872.
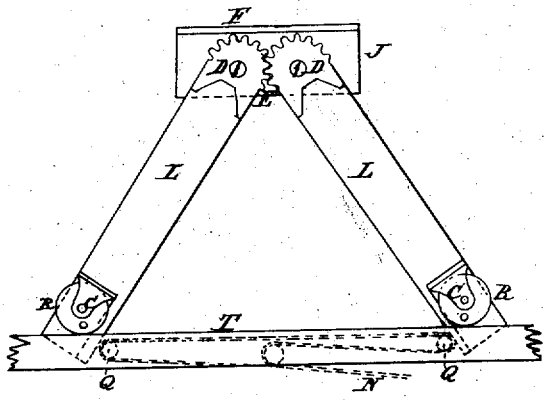
Witnesses:
T. C. Brecht.
D. P. Cowl
Inventor:
Peter K. Dederick
By Daniel Breed
Atty.

UNITED STATES PATENT OFFICE.

PETER K. DEDERICK, OF ALBANY, NEW YORK.

IMPROVEMENT IN BALING-PRESSES.

Specification forming part of Letters Patent No. 99,295, dated February 1, 1870; antedated August 1, 1869; reissue No. 5,023, dated August 6, 1872.

DIVISION B.

SPECIFICATION.

*To all whom it may concern:*

Be it known that I, PETER K. DEDERICK, of the city of Albany, county of Albany and State of New York, have invented a new and useful Improvement in Baling-Presses, of which the following is a specification:

My invention consists of a pair of levers resting at their lower ends on a track or tracks and connected at their upper ends, which are applied to the follower at separate points.

The accompanying drawing represents a detached view of a pair of levers provided with rollers at their lower ends, which rollers rest upon a track of the frame.

The frame of my press may be of the ordinary construction with a track, T, as seen in the drawing. The levers L have metal caps or sockets D at their upper ends, and are connected with the follower F at two separate points by pins or pivots 1; and they are also provided with cogs at their upper ends, which are thus geared together, as seen in the drawing. The lower ends of these levers rest on the track T, and either slide in said track or move on the friction-rollers R.

Power is applied by means of the ropes N in the usual manner, thus drawing the lower ends of the levers toward the center of the press and forcing the follower upward, the levers at the same time holding the follower level on account of their connection at their upper ends and their connection with the follower at two separate points.

By this arrangement no legs or guides are necessary to keep the follower level, as it is impossible for one lever to move faster than the other.

I claim—

1. The track or tracks T, in combination with the levers L, when said levers are connected at their upper ends and applied to the follower at separate points, as described.

2. I claim the combination of the track T, follower F, and levers L, when said levers are provided with metal caps or sockets, connected together and applied to the follower at separate points, substantially as and for the purpose set forth.

PETER K. DEDERICK.

Witnesses:
A. M. DEDERICK,
JAMES RORABACK.